(12) United States Patent
Gaurav et al.

(10) Patent No.: US 8,161,078 B2
(45) Date of Patent: Apr. 17, 2012

(54) ELECTRONIC DATA INTERCHANGE (EDI) DATA DICTIONARY MANAGEMENT AND VERSIONING SYSTEM

(75) Inventors: Suraj Gaurav, Issaquah, WA (US); Surendra Machiraju, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1210 days.

(21) Appl. No.: 11/533,636

(22) Filed: Sep. 20, 2006

(65) Prior Publication Data

US 2008/0071817 A1 Mar. 20, 2008

(51) Int. Cl.
*G06F 7/00* (2006.01)

(52) U.S. Cl. ........................................ 707/802

(58) Field of Classification Search ................. None
See application file for complete search history.

(56) References Cited

U.S. PATENT DOCUMENTS

| | | |
|---|---|---|
| 4,951,196 A | 8/1990 | Jackson |
| 5,202,977 A | 4/1993 | Pasetes, Jr. et al. |
| 5,367,664 A | 11/1994 | Magill et al. |
| 5,638,519 A | 6/1997 | Haluska |
| 5,687,385 A | 11/1997 | Janay |
| 5,758,126 A | 5/1998 | Daniels et al. |
| 5,778,223 A | 7/1998 | Velissaropoulos et al. |
| 5,878,419 A | 3/1999 | Carter |
| 5,909,570 A | 6/1999 | Webber |
| 6,151,608 A | 11/2000 | Abrams |
| 6,182,029 B1 | 1/2001 | Friedman |
| 6,199,068 B1 | 3/2001 | Carpenter et al. |
| 6,216,137 B1 | 4/2001 | Nguyen et al. |
| 6,381,743 B1 | 4/2002 | Mutschler, III |
| 6,418,400 B1 | 7/2002 | Webber |
| 6,453,356 B1 | 9/2002 | Sheard et al. |
| 6,480,860 B1 | 11/2002 | Monday |
| 6,542,873 B1 | 4/2003 | Goodwin, III et al. |
| 6,567,821 B1 | 5/2003 | Polk |
| 6,571,282 B1 | 5/2003 | Bowman-Amuah |
| 6,609,200 B2 | 8/2003 | Anderson et al. |
| 6,615,253 B1 | 9/2003 | Bowman-Amuah |
| 6,640,244 B1 | 10/2003 | Bowman-Amuah |

(Continued)

FOREIGN PATENT DOCUMENTS

KR 1020020033380 A 5/2002

OTHER PUBLICATIONS

Erhard Rahm and Philip Bernstein, A survey of approaches to automatic schema matching, The VLDB Journal 10:334-350 (2001).*

(Continued)

*Primary Examiner* — Christyann Pulliam
(74) *Attorney, Agent, or Firm* — Workman Nydegger

(57) ABSTRACT

An EDI data dictionary management and versioning system is provided having reusable EDI building blocks that are stored in relational format. Reusable EDI elements include, but are not limited to, data types, simple data elements, composite data elements, segments and loops. Storage of EDI building blocks is performed such that building blocks of new Schema are compared to existing building blocks to encourage re-use of building blocks, and to avoid duplicating blocks in storage. An EDI data dictionary editor tool is also provided that hides the complexity of an additional type system, such as an XSD Schema representing a TSD, so that only the EDI elements pertaining to the relevant TSD are displayed so that users are relieved from knowing about the additional type system.

6 Claims, 16 Drawing Sheets

U.S. PATENT DOCUMENTS

| | | | |
|---|---|---|---|
| 6,658,483 B1 | 12/2003 | Iwamoto et al. | |
| 6,687,873 B1* | 2/2004 | Ballantyne et al. | 715/215 |
| 6,694,321 B1 | 2/2004 | Berno | |
| 6,718,516 B1 | 4/2004 | Claussen et al. | |
| 6,724,896 B1 | 4/2004 | Beckett et al. | |
| 6,772,180 B1* | 8/2004 | Li et al. | 715/229 |
| 6,799,182 B2 | 9/2004 | Bata | |
| 6,901,380 B1 | 5/2005 | Bremers | |
| 6,915,287 B1 | 7/2005 | Felsted et al. | |
| 6,928,487 B2 | 8/2005 | Eggebraaten et al. | |
| 6,938,021 B2 | 8/2005 | Shear et al. | |
| 6,963,920 B1 | 11/2005 | Hohmann et al. | |
| 6,970,876 B2 | 11/2005 | Hotti et al. | |
| 6,996,589 B1 | 2/2006 | Jayaram et al. | |
| 7,043,687 B2 | 5/2006 | Knauss et al. | |
| 7,051,071 B2 | 5/2006 | Stewart | |
| 7,058,886 B1 | 6/2006 | Sulistio et al. | |
| 7,062,500 B1 | 6/2006 | Hall et al. | |
| 7,065,742 B1 | 6/2006 | Bogdan | |
| 7,072,909 B2 | 7/2006 | Polk | |
| 7,076,652 B2 | 7/2006 | Ginter et al. | |
| 7,099,896 B2 | 8/2006 | Fields et al. | |
| 7,203,679 B2* | 4/2007 | Agrawal et al. | 707/6 |
| 7,281,211 B2* | 10/2007 | Jeannette et al. | 715/234 |
| 7,284,196 B2* | 10/2007 | Skeen et al. | 715/234 |
| 7,305,614 B2* | 12/2007 | Chen et al. | 715/234 |
| 7,630,986 B1* | 12/2009 | Herz et al. | 707/2 |
| 7,774,300 B2* | 8/2010 | Hsiao et al. | 707/602 |
| 2001/0044811 A1 | 11/2001 | Ballantyne et al. | |
| 2002/0049790 A1 | 4/2002 | Ricker et al. | |
| 2002/0085033 A1 | 7/2002 | Robinson et al. | |
| 2002/0111964 A1 | 8/2002 | Chen et al. | |
| 2002/0129045 A1 | 9/2002 | Aoyama et al. | |
| 2002/0161907 A1 | 10/2002 | Moon | |
| 2003/0018666 A1* | 1/2003 | Chen et al. | 707/513 |
| 2003/0088543 A1 | 5/2003 | Skeen et al. | |
| 2003/0097637 A1 | 5/2003 | Tozawa et al. | |
| 2003/0101184 A1 | 5/2003 | Chiu et al. | |
| 2003/0121001 A1 | 6/2003 | Jeannette et al. | |
| 2003/0121008 A1 | 6/2003 | Tischer | |
| 2003/0158805 A1 | 8/2003 | Mozhdehi | |
| 2004/0001099 A1 | 1/2004 | Reynar et al. | |
| 2004/0025117 A1* | 2/2004 | Ingersoll et al. | 715/523 |
| 2004/0054610 A1 | 3/2004 | Amstutz et al. | |
| 2004/0098311 A1 | 5/2004 | Nair et al. | |
| 2004/0103367 A1 | 5/2004 | Riss et al. | |
| 2004/0177094 A1* | 9/2004 | Jacobs et al. | 707/104.1 |
| 2004/0225571 A1 | 11/2004 | Urali | |
| 2004/0237038 A1 | 11/2004 | Stuhec | |
| 2004/0254953 A1* | 12/2004 | Vincent, III | 707/103 Y |
| 2005/0015377 A1 | 1/2005 | Wan | |
| 2005/0055631 A1* | 3/2005 | Scardina et al. | 715/513 |
| 2005/0060324 A1 | 3/2005 | Johnson et al. | |
| 2005/0108630 A1 | 5/2005 | Wasson et al. | |
| 2005/0132276 A1* | 6/2005 | Panditharadhya et al. | 715/513 |
| 2005/0138047 A1 | 6/2005 | Liu et al. | |
| 2005/0177578 A1 | 8/2005 | Chen et al. | |
| 2005/0203953 A1 | 9/2005 | McGee et al. | |
| 2005/0204347 A1 | 9/2005 | Jurkiewicz et al. | |
| 2005/0257193 A1 | 11/2005 | Falk et al. | |
| 2005/0262194 A1* | 11/2005 | Mamou et al. | 709/203 |
| 2005/0262499 A1 | 11/2005 | Read | |
| 2005/0273467 A1 | 12/2005 | Gardner | |
| 2005/0278345 A1 | 12/2005 | Andra et al. | |
| 2005/0289186 A1 | 12/2005 | Guo et al. | |
| 2006/0036522 A1 | 2/2006 | Perham | |
| 2006/0143459 A1 | 6/2006 | Villaron et al. | |
| 2006/0236317 A1 | 10/2006 | Wetherly et al. | |
| 2006/0259456 A1 | 11/2006 | Falk et al. | |
| 2007/0112579 A1 | 5/2007 | Ratnakaran et al. | |
| 2007/0143320 A1* | 6/2007 | Gaurav et al. | 707/101 |
| 2007/0143334 A1* | 6/2007 | Gaurav et al. | 707/102 |
| 2007/0143610 A1* | 6/2007 | Machiraju et al. | 713/169 |
| 2007/0143665 A1* | 6/2007 | Machiraju et al. | 715/513 |
| 2007/0156716 A1 | 7/2007 | Said et al. | |
| 2007/0203921 A1* | 8/2007 | Gaurav et al. | 707/100 |
| 2007/0203926 A1* | 8/2007 | Gaurav et al. | 707/101 |
| 2007/0203928 A1* | 8/2007 | Machiraju et al. | 707/101 |
| 2007/0203932 A1* | 8/2007 | Gaurav et al. | 707/102 |
| 2007/0204214 A1* | 8/2007 | Gaurav et al. | 715/513 |
| 2007/0299858 A1 | 12/2007 | Norcott | |
| 2008/0071806 A1* | 3/2008 | Gaurav et al. | 707/100 |
| 2008/0071887 A1* | 3/2008 | Gaurav et al. | 709/220 |
| 2008/0072160 A1* | 3/2008 | Gaurav et al. | 715/758 |
| 2008/0126385 A1* | 5/2008 | Gaurav et al. | 707/102 |
| 2008/0126386 A1* | 5/2008 | Gaurav et al. | 707/102 |
| 2008/0147704 A1 | 6/2008 | Godwin et al. | |
| 2008/0168081 A1* | 7/2008 | Gaurav et al. | 707/102 |
| 2008/0168109 A1* | 7/2008 | Gaurav et al. | 707/203 |
| 2008/0222192 A1 | 9/2008 | Hughes | |
| 2008/0235251 A1 | 9/2008 | Shmueli et al. | |
| 2009/0254971 A1* | 10/2009 | Herz et al. | 726/1 |

OTHER PUBLICATIONS

Guidline XML (gXML), Version 0.7, Mar. 2, 1999, Initial Draft; http://xml.coverpages.org/GXML-Draft-v07-pdf.gz.

David Messinger, EDI Testing Requirements Specification, Topcoder Software, Jul. 30, 2004, http://www.topcoder.com/i/development/downloads/EDI_Transaction_Processor.pdf.

Uddam Chukmol, et al., EXSMAL:EDI/XML semi-automatic Schema Matching ALgorithm, Proceedings of the Seventh IEEE International Conference on E-Commerce Technology, 2005, http://ieeexplore.ieee.org/iel5/10218/32584/01524079.pdf?isNumber=.

Altova Schema Agent, Viewing MapForce Mapping Designs; Dec. 5, 2006, http://www.altova.com/schemaagent_mapforce.html.

Tova Milo and Sagit Zohar. Using schema matching to simplify heterogeneous data translation. In Proc. of the Int. Conf. on Very Large Data Bases (VLDB), New York City, USA, 1998. http://www.sigmod.org/vldb/conf/1998/p122.pdf.

A. Doan, P. Domingos, and A. Levy. Reconciling Schemas of Disparate Data Sources: A Maching-Learning Approach. In SIGMOD, pp. 509-520, 2001. http://anhai.cs.uiuc.edu/home/papers/sigmod01.pdf.

Grundy, J.C., Mugridge, W.B., Hosking, J.G. and Kendall, P. Generating EDI Message Translations from Visual Specifications, In Proceedings of the 2001 IEEE Automated Software Engineering Conference, San Diego, CA, Nov. 26-28, 2001, IEEE CS Press. http://www.cs.auckland.ac.nz/~john-g/papers/ase2001_1.pdf.

OA Dated Dec. 15, 2008 for U.S. Appl. No. 11/621,372, 35 pages.
OA Dated Feb. 25, 2009 for U.S. Appl. No. 11/533,601, 77 pages.
OA Dated Mar. 2, 2009 for U.S. Appl. No. 11/533,626, 46 pages.
International Search Report dated Jan. 15, 2008 for PCT Application Serial No. PCT/US2007/078736, 2 Pages.

International Search Report and Written Opinion dated Mar. 12, 2008, for PCT Application Serial No. PCT/US2007/078733, 10 Pages.

International Search Report and Written Opinion dated Apr. 29, 2008 for PCT Application Serial No. PCT/US2007/089239, 10 Pages.

International Search Report and Written Opinion dated Apr. 29, 2008 for PCT Application Serial No. PCT/US2007/089238, 10 Pages.

Pal, et al., "XML Support in Microsoft SQL Server 2005", May 2004, http://www.only4gurus.net/microsoft/xml_sql_2005.pdf.

Zou, et al., "A Framework for Migrating Procedural Code to Object-Oriented Platforms", http://braindump.samedi-studios.com/people/crutcher/paper-cache/apsec01-kk-yz-f10.pdf.

Liu, et al., "Configurable Indexing and Ranking for XML Information Retrieval", 2004, pp. 88-95, http://delivery.acm.org/10.1145/1010000/1009010/p88-liu.pdf?key1=1009010&key2=3952344511&coll=portal&dl=GUIDE&CFID=626850&CFTOKEN=31267320.

"Desktop EDI™", http://www.gxs.com/products/accelerators/desktop_EDI.htm.

"Understanding BizTalk Server 2006", Oct. 2005, http://download.microsoft.com/download/E/5/A/E5A1D056-5778-4DB1-94F4-9AE6C4496AC4/Understanding.doc.

Lee, Ronald M., "Design of Electronic Documents Using XML Schemas", Aug. 27, 2001, http://www.euridis.nl/pub/documentation/IPXDOCN_04SEP01/IPXDOCN_XMLSCHEMA_27aug01.doc.

Wob, Wolfram, "Enhancing E-Business Applications in Small and Medium-Sized Enterprises with XML-based EDI", http://www.faw.uni-linz.ac.at/FAW_WWW/online/papers/2003sci/ww_sci03.pdf.

Adam et al., "EDI through a Distributed Information Systems Approach", Date: Jan. 6-9, 1998,pp. 354-363, vol. 7, http://ieeexplore.ieee.org/iel4/5217/14150/00649230.pdf?isnumber=&arnumber=649230.

Korhonen, et al., "Visualization of EDI messages: Facing the problems in the use of XML", Date: Apr. 2003, http://delivery.acm.org/10.1145/950000/948065/p465-korhonen.pdf?key1=948065&key2=3287054511&coll=Portal&dl=GUIDE&CFID=74220359&CFTOKEN=92790055.

Suresh Damodaran, "B2B Integration over the Internet with XML—RosettaNet Successes and Challenges", Date: 2004, http://www2004.org/proceedings/docs/2p188.pdf.

Abitbout, et al., "Declarative Specification of Electronic Commerce Applications", Feb. 2000, http://www.cs.toronto.edu/~mignet/Publications/ieee2000.pdf.

Friedrich II, John R., "Meta-Data Version And Configuration Management In Multi-Vendor Environments", 2005, pp. 799-804, http://delivery.acm.org/10.1145/1070000/1066251/p799-friedrich.pdf?key1=1066251&key2=7522954511&coll=GUIDE&dl=GUIDE&CFID=741587&CFTOKEN=83197199.

Rollins, et al., "A framework for creating customized multi-modal interfaces for XML documents", 2000, pp. 933-936, vol. 2, http://ieeexplore.ieee.org/xpl/abs_free.jsp?arNumber=871512.

Florescu, et al., "Storing and Querying XML Data using an RDMBS", 1999, http://scholar.google.com/scholar?hl=en&lr=&q=cache:m3NVseOL_1UJ:dblab.ssu.ac.kr/development/benchmark/XML/FIKo99.pdf+%22electronic+data+interchange%22+grouping+indexing+cluster.

Per, Christiansson, "Using Knowledge Nodes for Knowledge Discovery and Data Mining", 1998, pp. 48-59, http://it.civil.auc.dk/it/reports/ascona_98/ascona98.html.

"PeopleSoft EdI Messaging", http://download-west.oracle.com/otn_hosted_doc/psft/fscm/Electronic%20Data%20Interchange.pdf.

Bohannon, et al., "Information preserving XML schema embedding", 2005, pp. 85-96, VLDB Endowment, http://portal.acm.org/citation.cfm?id=1083606 http://delivery.acm.org/10.1145/1090000/1083606/p85-bohannon.pdf?key1=1083606&key2=9573154511&coll=GUIDE&dl=GUIDE&CFID=2735513&CFTOKEN=80537832.

Ogbuji, Uche, "XML: The future of EDI", http://www.oasis-open.org/cover/ogbuji-swol-02-xmledi.html.

* cited by examiner

= Version 1

= Version 2

= Version 3

Table 700

DataType × Table

| Field Name 710 | Data Type 720 |
|---|---|
| RowId | Text |
| Name | Text |
| Description | Text |
| EdiMessageType | Text |
| DataType | Text |
| MinLength | Number |
| MaxLength | Number |
| EnumTableId | Text |
| Precision | Number |
| CreatedByChangeList | Number |
| OpenedByChangeList | Number |
| LatestVersion | Number |
| Visibility | Text |

FIG. 7

Table 800

| Field Name | Data Type |
|---|---|
| RowId | Text |
| ParentObjectId | Text |
| BaseObjectReferenceId | Text |
| MinOccurs | Number |
| MaxOccurs | Number |
| BaseObjectVersion | Number |

FIG. 8

Table 900

ChangeLogJournal : Table

| Field Name | Data Type |
|---|---|
| ObjectId | Text |
| DataObjectId | Text |
| ChangeListNumber | Number |
| CreateOrModifyOrDelete | Text |
| DataObjectVersion | Number |

FIG. 9

ELECTRONIC DATA INTERCHANGE (EDI) DATA DICTIONARY MANAGEMENT AND VERSIONING SYSTEM

TECHNICAL FIELD

The subject invention relates to electronic data interchange (EDI) communications systems, and more particularly to an EDI data dictionary management and versioning system for use in EDI communications systems.

BACKGROUND

EDI may be defined as computer-to-computer exchange of business information using 'approved' formatting standards. Millions of companies around the world use EDI to conduct commerce. With EDI, organizations have been empowered to send virtually limitless kinds of structured messages to one another to facilitate the communication of any kind of business data from one organization to another in more efficient ways. In this regard, once setup properly, EDI messages can be used to automate a variety of communications to and from partners, business sub-units, buyers, etc., thereby substantially reducing the overhead associated with filling out paper forms, storing volumes of papers, etc. With EDI, for instance, an organization merely fills out an electronic form in a manner conforming to a pre-defined schema, and then the messaging, storage/record keeping and validation of the message (s) associated with the electronic form occurs automatically.

In current EDI messaging scenarios, which applies to both inbound messages (i.e., where a message is received by an organization) and to outbound messages (i.e., where a message is transmitted from an organization to an intended recipient of the message), a single message can be addressed for multiple parties, and multiple messages can be received from different parties. EDI messages can be represented in a native EDI compact file format, or as an extensible markup language (XML) file, and there are known ways of transforming from EDI flat files to XML representations, and vice versa. EDI data is transmitted as delimited files (without self describing tags) and therefore the encoding rules enforce very strict formatting rules to ensure the destination application is able to successfully parse and consume the information for down stream processing.

As alluded to above, EDI messages have an associated EDI schema that instructs an EDI system how to interpret a given EDI message instance, i.e., how to validate an EDI message has been structured correctly and with appropriate information. For instance, when an EDI message of a particular type, e.g., a purchase order, is created by an EDI system, the EDI message is created in a way that conforms to the purchase order schema. Today, XML Schema Definitions (XSDs), external data representations (XDRs) and document type definitions (DTDs) are typically used to represent schemas for EDI messages. In this regard, XSDs, XDRs and DTDs are schema files that can be created to describe the schema for a particular kind of EDI message. Today, these XSD, XDR and DTD files are stored as individual files that are used in connection with the validation and generation of EDI messages in an EDI system.

When an organization is maximizing the value of EDI messaging, however, the organization might thus be storing numerous schemas on behalf of the EDI system. Once the number of schemas starts to exceed a few dozen, for instance, the storage requirements and management of those schemas can become non-trivial. This is for a number of reasons beyond the mere complexity of the problem due to excessive numbers of schema.

For instance, schemas evolve over time according to different versions, however, there is presently no support in current EDI systems for versioning of EDI schemas that evolve or otherwise change over time. An old schema must be replaced by a new schema in such case without retention of a versioning understanding by the system.

Additionally, many EDI elements that compose EDI schemas are represented in multiple schemas repeatedly, and yet no re-use of those EDI elements is presently possible. In this regard, there are thousands of EDI message types, also called transaction set definitions (TSDs). TSDs are composed of reusable units of items, which can be customized according to different business needs. Accordingly, it is desirable to have an EDI system that allows reuse of such units and manages their versioning.

Moreover, today's tools for viewing and editing an EDI schema file, e.g., as may be represented in an XSD file, display portions of the XSD file that do not pertain to the EDI elements represented by the XSD file. The problem with this is that today's tools do not have an understanding of the underlying nature of the TSD represented by the XSD file. Instead, today's tools display the entire XSD file to a user, which potentially leads to confusion because users are unable to filter out the unrelated XSD portions. They expect users to have a good understanding of XSDs, which is not desirable.

Accordingly, in consideration of the lack of sophistication of the current state of the art of the representation, storage, and management of EDI schemas in an EDI communications system, it would be desirable to provide improved tools and storage management systems for improved storage, management, reusability, versioning, editing, display and interaction with schemas in an EDI system. These and other deficiencies in the state of the art of EDI messaging will become apparent upon description of the various exemplary non-limiting embodiments of the invention set forth in more detail below.

SUMMARY

In consideration of the foregoing, the invention provides an EDI data dictionary management and versioning system having reusable EDI building blocks that are stored in relational format. Reusable EDI elements include, but are not limited to, data types, simple data elements, composite data elements, segments and loops. Storage of the EDI building blocks is performed such that building blocks of new schema are compared to existing building blocks to encourage re-use of building blocks, and to avoid duplicate storage. An EDI data dictionary editor tool is capable of hiding the complexity of an additional type system, such as an XSD schema representing a TSD, to display only the EDI elements that matter to the TSD so that users are relieved from additionally needing to understand the additional type system.

A simplified summary is provided herein to help enable a basic or general understanding of various aspects of exemplary, non-limiting embodiments that follow in the more detailed description and the accompanying drawings. This summary is not intended, however, as an extensive or exhaustive overview. The sole purpose of this summary is to present some concepts related to the various exemplary non-limiting embodiments of the invention in a simplified form as a prelude to the more detailed description that follows.

BRIEF DESCRIPTION OF THE DRAWINGS

The EDI schema storage, analysis and editing techniques in accordance with the present invention are further described with reference to the accompanying drawings in which:

FIG. 7 illustrates an exemplary Data Type table for a dictionary for EDI schema data represented in relational format in accordance with a non-limiting embodiment of the invention;

FIG. 8 illustrates an exemplary Object Reference table for a dictionary for EDI schema data represented in relational format in accordance with a non-limiting embodiment of the invention;

FIG. 9 illustrates an exemplary Change Log Journal table for a dictionary for EDI schema data represented in relational format in accordance with a non-limiting embodiment of the invention;

DETAILED DESCRIPTION

Overview

In consideration of the lack of sophistication in today's EDI schema storage systems, in various non-limiting embodiments, the invention provides a dictionary of reusable EDI elements consisting of various types of entities, such as data types, simple data elements, composite data elements, segments and loops. In another non-limiting aspect, the invention further supports the storage of such elements and their versioning. In another non-limiting aspect, the invention enables the extraction of reusable pieces from an XML schema representing an EDI document using a structural equivalence analysis. In another non-limiting aspect, a user friendly EDI data dictionary editor is implemented that is capable of hiding the complexity of an underlying type system, like an XML schema, from the user viewing and editing the EDI elements. These and other exemplary, non-limiting aspects of the invention are further described in more detail below.

EDI Data Dictionary Management and Versioning System

In various non-limiting embodiments, the invention improves the creation, storage, versioning, editing and display of EDI schemas. As mentioned, there are thousands of TSDs in an EDI system that represent EDI message types. With EDI, a TSD is identified by a DocType, which is a combination of namespace and root node name. More formally, this is described by the following relation:

DocType=TargetNamespace '#' RootNodeName

X12 schemas are represented according to the following form: X12_{Version}_{TsId}. In this X12form, all schemas have a root node name that starts with 'X12'. The 'Version' in turn represents the version of the document, which is a dynamic piece of information that is configuration or instance driven. Lastly, 'TsId' is the transaction identifier of the document being processed and is always read from the input instance.

Edifact schemas are represented according to the following form: Efact_{Version}_{Tsid} Thus, all Edifact schemas have a root node name that starts with 'Efact'. 'Version' represents the version of the document, and 'Version' is a dynamic piece of information which is instance driven, i.e., configuration driven is not an option with Edifact schemas. 'TsId' again represents the transaction identifier of the document being processed and is always read from the input instance.

Figure 1:
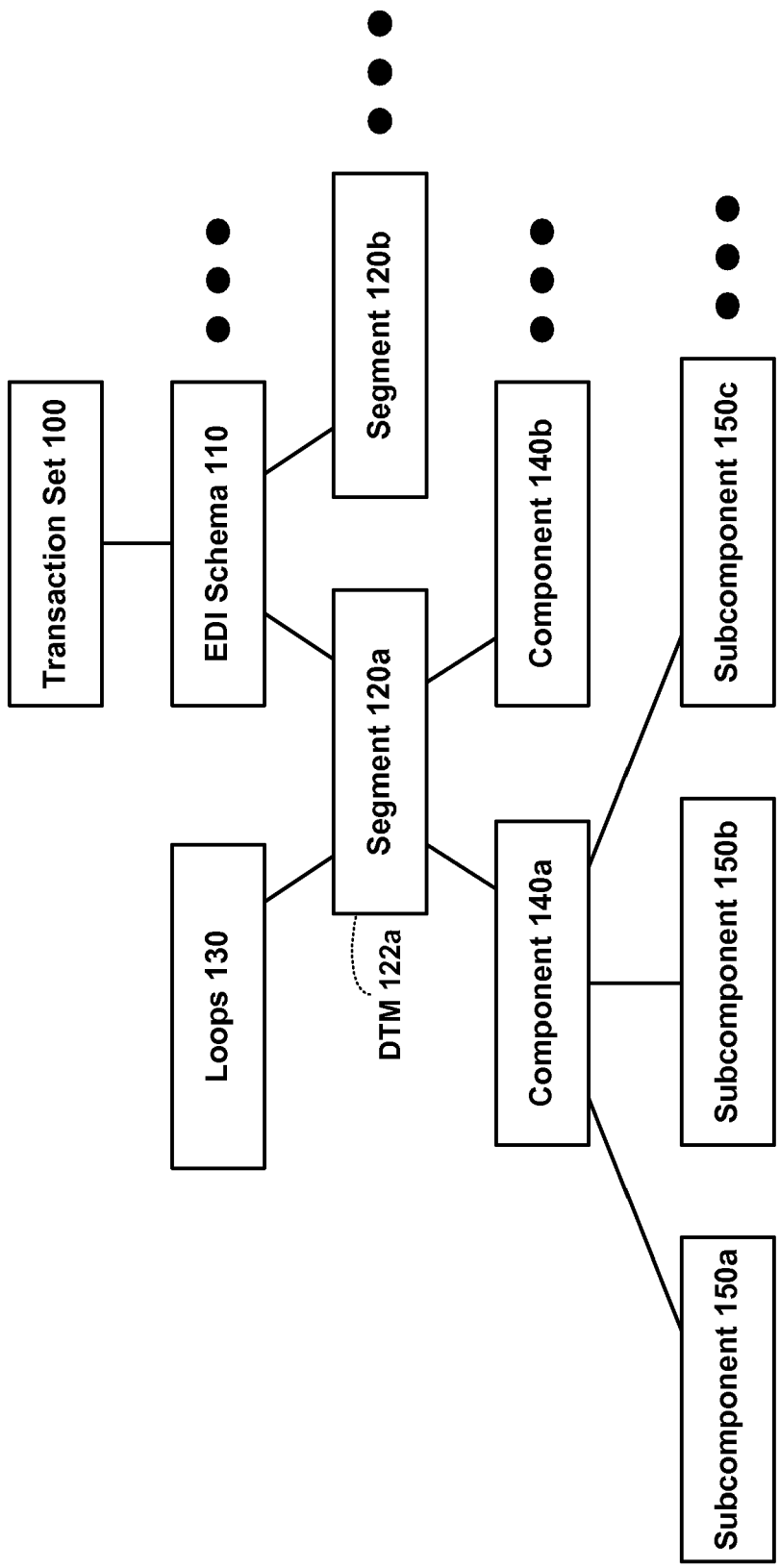
FIG. 1 illustrates an exemplary view of a transaction set including one or more EDI schemas in accordance with the storage techniques of the invention.

An EDI schema consists of a root node. Each root node can have a sequence of loops and segments as children. Loops can contain nested sub-loops or segments. The structure of an exemplary TSD 100 including an EDI schema 110 is illustrated in FIG. 1. As illustrated, a schema 110 includes segments such as segment 120a and segment 120b as branches. Each segment 120a, in addition to having information such as a date/time reference DTM 122a, may include loops 130. Loops 130 can refer to segments or to other loops. Each segment 120a may in turn have components, such as component 140a and component 140b, and so on. And each component, such as component 140a, may additionally comprise further subcomponents such as subcomponent 150a, subcomponent 150b and subcomponent 150c.

In more formal terms, an EDI document schema includes the following structure

---

Schema -> RootNode
RootNode -> (Block)+
Block -> Segment | Loop
Loop -> (Block)+
Segment -> (DataElement)+, RuleSet
DataElement -> SimpleField | CompositeField
SimpleField -> name, dataTypeName
CompositeField -> (SimpleField)+

---

In these more formal terms, segments 120a, 120b, etc. of schema 110 of FIG. 1 thus include EDI Data Elements ("Data Elements"), including composite data elements that are collections of Data Elements. Data Elements include a name, and its minimum and maximum number of occurrences, and a Data Type, e.g., "AN" which means alphanumeric, or "N" which means numeric. Data Types for Data Elements can be defined to include a minimum length, a maximum length, a name (e.g., UOM—unit of measure), and values for the name (e.g., kg, ml, cc, lbs, etc.).

More specifically, X12 Data Types can be any of the following:

Nn—an integer type with an implied decimal point, specified by n>=0.

ID—an enumeration data type with optional length restrictions.

AN—an alphanumeric data type with length restrictions.

R—a real number.

Date—a date data type.

Time—a time data type

And Edifact data types can be defined to be any of the following:

A—an alphabetic data type with a length restriction.

N—a numeric data type with length restriction.

ID—an enumeration data type with optional length restrictions.

AN—an alphanumeric data type with length restrictions.

As mentioned in the background, in the past, these structures have been represented in XSDs, XDRs, DTDs, etc., i.e., as separate files. They are inherently difficult to understand as they contain lot of type-specific code. In addition, they do not leverage the powers that relational forms of storage have yielded for the storage of data. In this regard, in an exemplary, non-limiting aspect of the invention, EDI schema and the associated EDI Data Elements are stored as a relational schema, i.e., stored in a relational database as a relational file, e.g., Microsoft's Access files (MDB format), as described in more detail below. The tree structure of the schema 110 of FIG. 1 lends itself to efficient storage in a relational format, in that relational data structures are well suited to representing hierarchical tree data.

Thus, as discussed in the overview above, in one exemplary, non-limiting invention, the invention builds a data dictionary for EDI schema representing EDI Data in relational storage, such as the structured query language (SQL) format. As a result, EDI TSDs can be decomposed into smaller pieces which can be efficiently reused by other TSDs. Thus, in accordance with an exemplary embodiment of the invention, EDI building blocks that can be reused include Data types, Simple data elements containing DataTypes, Composite data elements that contain other Simple data elements, Segments that contain Simple and/or Composite elements and Loops that contain other Loops and/or Segments.

Figure 2:
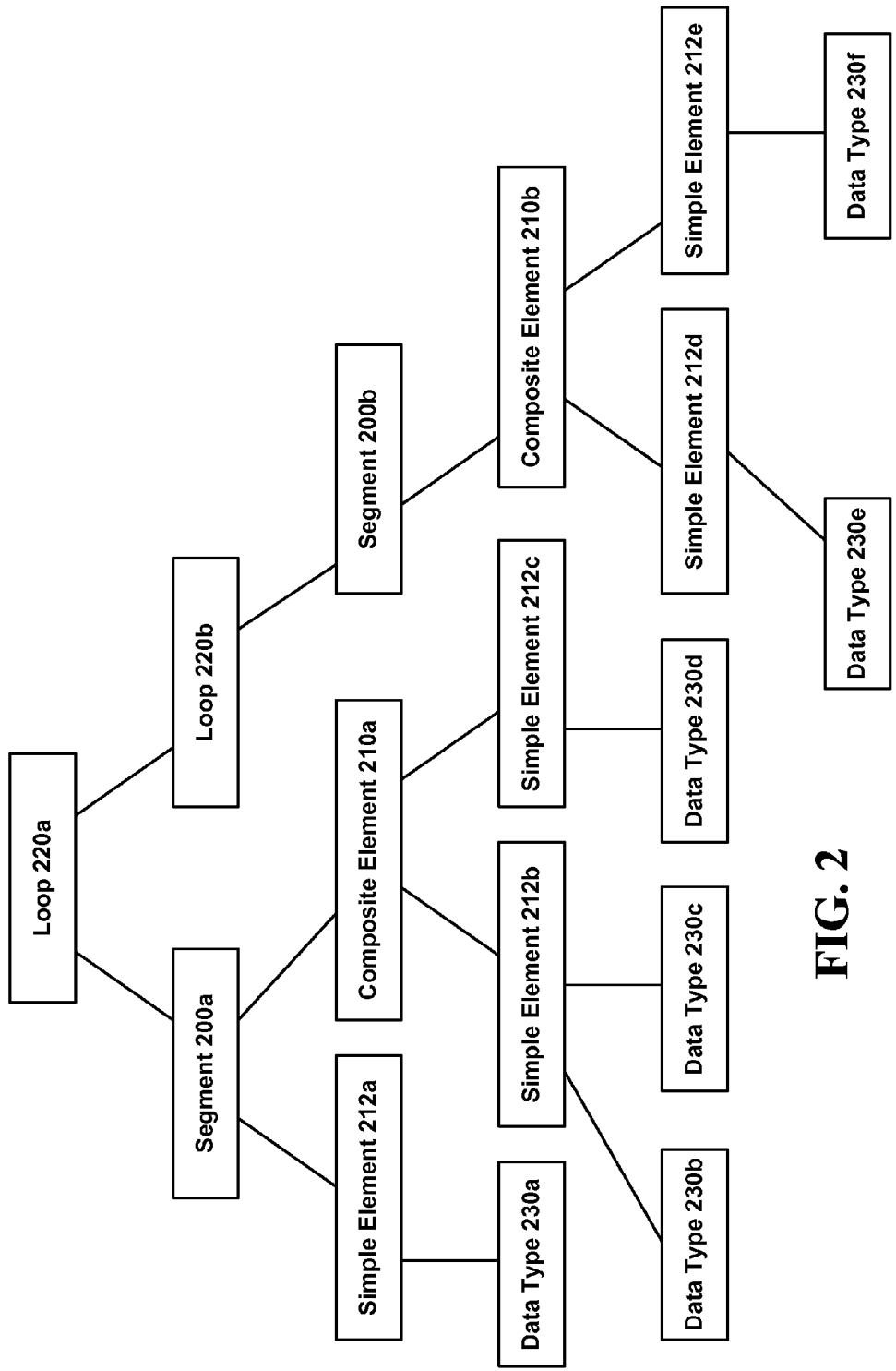
FIG. 2 is a block diagram of an exemplary schema divided into building blocks in accordance with the storage techniques of the invention.

This hierarchy is illustrated in the exemplary schema representation of FIG. 2. At the lowest level of re-use in the presently described embodiment of the invention, data types 230*a*, 230*b*, 230*c*, 230*d*, 230*e*, 230*f* can be re-used across different schema TSDs. Then, at the next level are Simple Data Elements 212*a*, 212*b*, 212*c*, 212*d*, 212*e*, etc. that contain Data types. Composite Data Elements 210*a* and 210*b* contain other Simple Data Elements such as Simple Data Elements 212*b* and 212*c* and Simple Data Elements 212*d* and 212*e*, respectively. Segment 200*a* contains Simple Data Element 212*a* and Composite Data Element 210*a*. Segment 200*b* contains Composite Data Element 210*b*. Lastly, Loop 220*a* contains Loop 220*b* and Segment 200*a*, and Loop 220*b* further contains Segment 200*b*.

Figure 3:
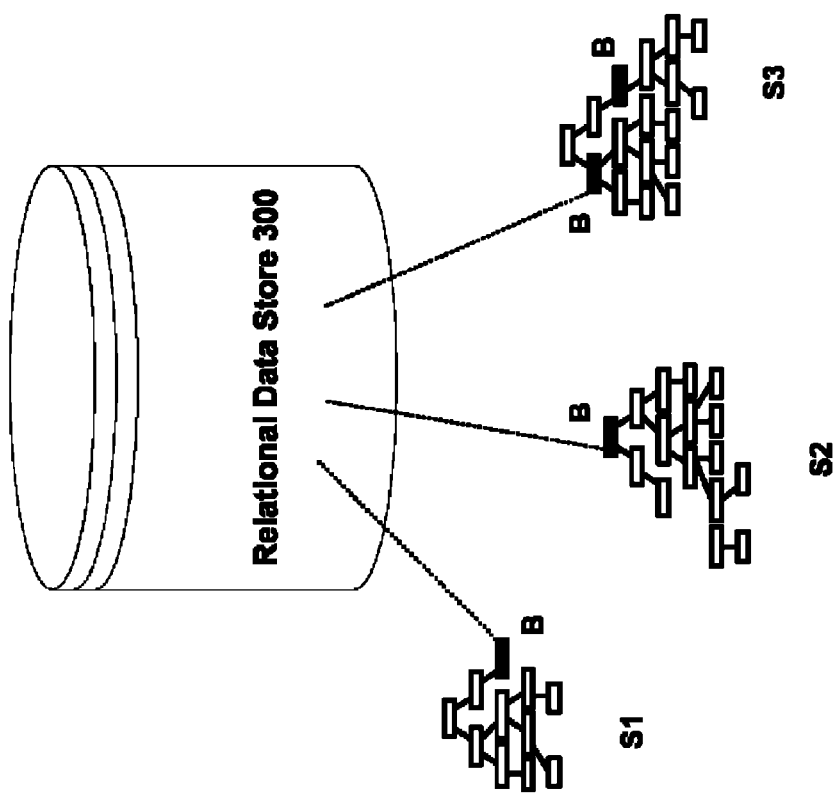
FIG. 3 illustrates an aspect of reusable storage blocks in a relational database in accordance with various non-limiting embodiments of the invention.
Figure 4:
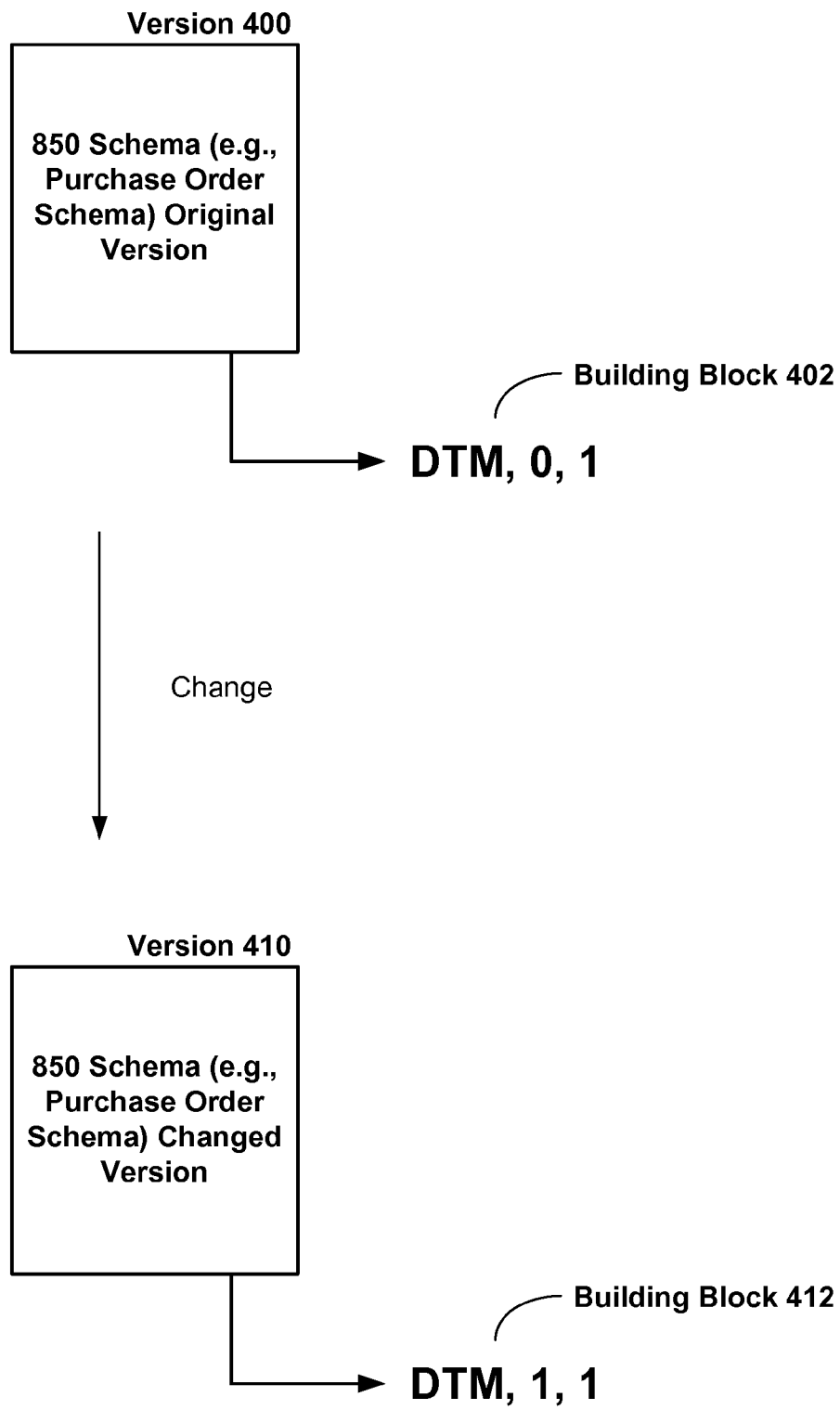
FIG. 4 is a block diagram illustrating a change from a first version of an EDI schema to a second version of the EDI schema to be versioned according to the various techniques of the invention.

Accordingly, in one embodiment of the invention, as illustrated conceptually by FIG. 3, any of Loops, Segments, Simple Data Elements, Composite Data Elements and/or Data Types can be re-used as EDI schema building blocks of schemas S1, S2, S3, etc. for relational storage 300 in accordance with the invention. As shown, building block B is re-used for multiple schemas S1, S2 and S3, and is re-used twice in schema S3. Thus, with the invention, a block of schema is only defined once and then can be used in multiple places, i.e., re-used for different schema, or even within the same schema.

In another exemplary, non-limiting aspect of the invention, each EDI building block is allowed to evolve over time and be modified, e.g., to reflect changing business needs. For instance, a business might move from America to Europe and have to switch a UOM (unit of measure) represented in an EDI schema from pounds to kilograms. In such a case, after such a change is made, today, there is no way to preserve the version information as the building blocks of the EDI schema change in a way that is meaningful to the data store representing the EDI schema.

For another example, as shown in exemplary original version 400 of EDI 850 Schema (e.g., a Purchase Order Schema), the Schema includes a re-usable and versionable building block 402 that currently has no Date/Time Reference (DTM) requirement, as designated by the zero. However, the customer than demanded that the Purchase Order start using the DTM, and so the Schema is changed resulting in Version 410 and Building Block 412. In accordance with the invention, building block 412 becomes a version of building block 402.

Figure 5:
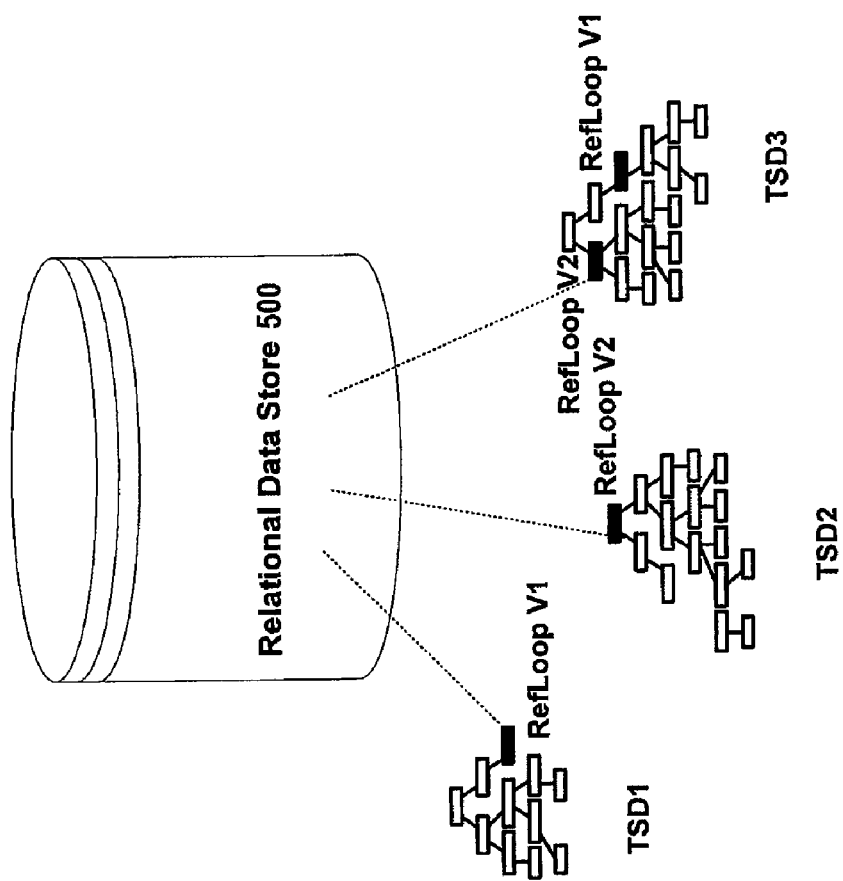
FIG. 5 illustrates an aspect of reusable and versionable storage blocks in a relational database in accordance with various non-limiting embodiments of the invention.

Thus, the invention enables versioning information for each copy of a building block as it changes and allows multiple versions to be used independently. Thus, with versioned EDI schema building blocks of the invention, it is possible to have a first TSD use the first version of a loop building block named RefLoop while a second TSD might use the second version of RefLoop. Indeed, with versioned EDI schema building blocks, a single TSD can separately use both the first and second versions of RefLoop. This situation is illustrated in the data dictionary of the invention stored in relational data store 500 of FIG. 5 wherein RefLoop V1 is used in TSD1 and TSD3, and RefLoop V2 is used in TSD2 and TSD3.

In this regard, the invention supports versioning for two kinds of changes to a Schema: a change to a property and a change to the structure. For instance, a change to a property might be a change to the minimum number of occurrences, the maximum number of occurrences, or the name of the property. A change to the structure of the Schema might include insertion of a new child element, moving an existing child element from one position in the Schema to another, rearranging Loop order, etc.

Accordingly, as described above in various non-limiting embodiments, the invention enables the storage of EDI Data dictionary elements and their versioning. Each element is treated as an object that can be saved and recreated from its saved version. All changes to an object are tracked by a unique identifier, called a changeList. In one non-limiting implementation, a single changeList can modify multiple objects.

Figure 6:
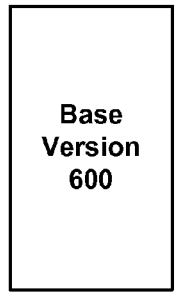
FIG. 6 illustrates a storage representation for changes from version to version to minimize redundancy of storing many versions.
Figure 6:
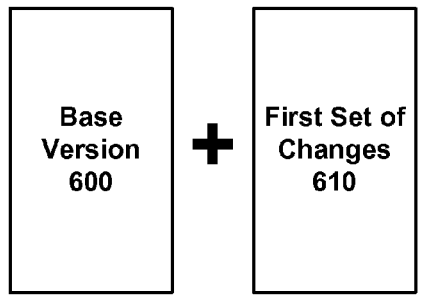
Figure 6:
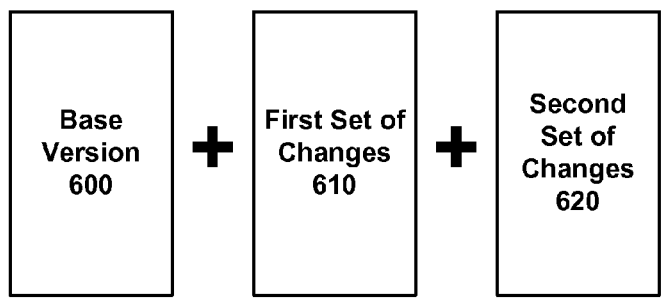

As shown in exemplary fashion in FIG. 6, in one embodiment, a version is reconstructed by starting with the first version 600, and then adding on changes 610 to get to the second version, and then additionally enacting changes 620 to get to the third version.

Each object thus has an associated version number. In an exemplary, non-limiting embodiment of the invention, when an object is created the first time, it is given a version number of 1. All subsequent changes to the object are saved in the system as differencing information, i.e., the nature of changes is saved in the system as opposed to saving a new copy of the entire object. This results in efficient storage. Otherwise, over a period of time, when hundreds of versions of an object exist, there would be too much duplication of information.

As mentioned, in accordance with the invention, the objects are themselves stored in relational format. An exemplary table structure 700 representing such objects is displayed partially in FIG. 7 having Field Names 710 and associated Data Types 720. Each data type 720 has a name 710. Other columns might include optional descriptions, EdiMessageType, etc. The fields additionally stored in accordance with the invention include the following fields to support one or more aspects of the versioning described above:

CreatedByChangeList—the change list number that created this object

OpenedByChangeList—whether this object is currently being edited or not

LatestVersion—the latest version of this object

In an exemplary, non-limiting embodiment of the invention, all objects that can be versioned share the above three attributes while their other properties are object specific. For instance, a DataType and SimpleField object share the above three attributes, but differ in other properties.

With respect to object references, an object can be used in various places in accordance with the invention. Thus, a Segment can be reused by a Loop or another TSD. Whenever an object is used, a reference is made to it, which is then stored in a table such as the object reference table 800 represented in FIG. 8. Each use of an object points to the identifier of the base object along with its version.

A change log can modify multiple objects. All the objects modified by a changeList are contained in a changeLogJournal. Exemplary structure for a Change Log Journal table 900 is displayed in FIG. 9. Table 900 captures the object identifier of the object, the changeList number that caused the change and the new version of the object. In addition, each change indicates the type of operation performed on an object. In one embodiment, this includes: Creation of an object, Modification of an object and Deletion of an object.

In another exemplary, non-limiting aspect, the invention enables extraction of reusable pieces from an XML schema through structural equivalence analysis. It can be appreciated that modeling EDI payloads as XML data has a lot of benefits. However, using XML schemas requires lot of skill and expertise. Thus, the dictionary system of the present invention has the native capability to generate XML schema from TSDs stored in a relational system according to the above-described techniques. Consequently, users are advantageously freed to deal with TSDs that are much easier to understand than XML schemas, which include a lot of extra information and formatting beyond EDI Data in order to adhere to XML rules.

In addition to being able to natively generate an XML schema from an EDI schema stored according to the invention, users can import external XML schemas into the dictionary system of the invention. During the import process, the XML schema is parsed and broken into smaller pieces like data types, simple elements, composite elements, etc., e.g., as described above for FIG. 2. For each of these building blocks, the system compares the structure of the building blocks with the ones already existing in the relational data store.

Figure 10:
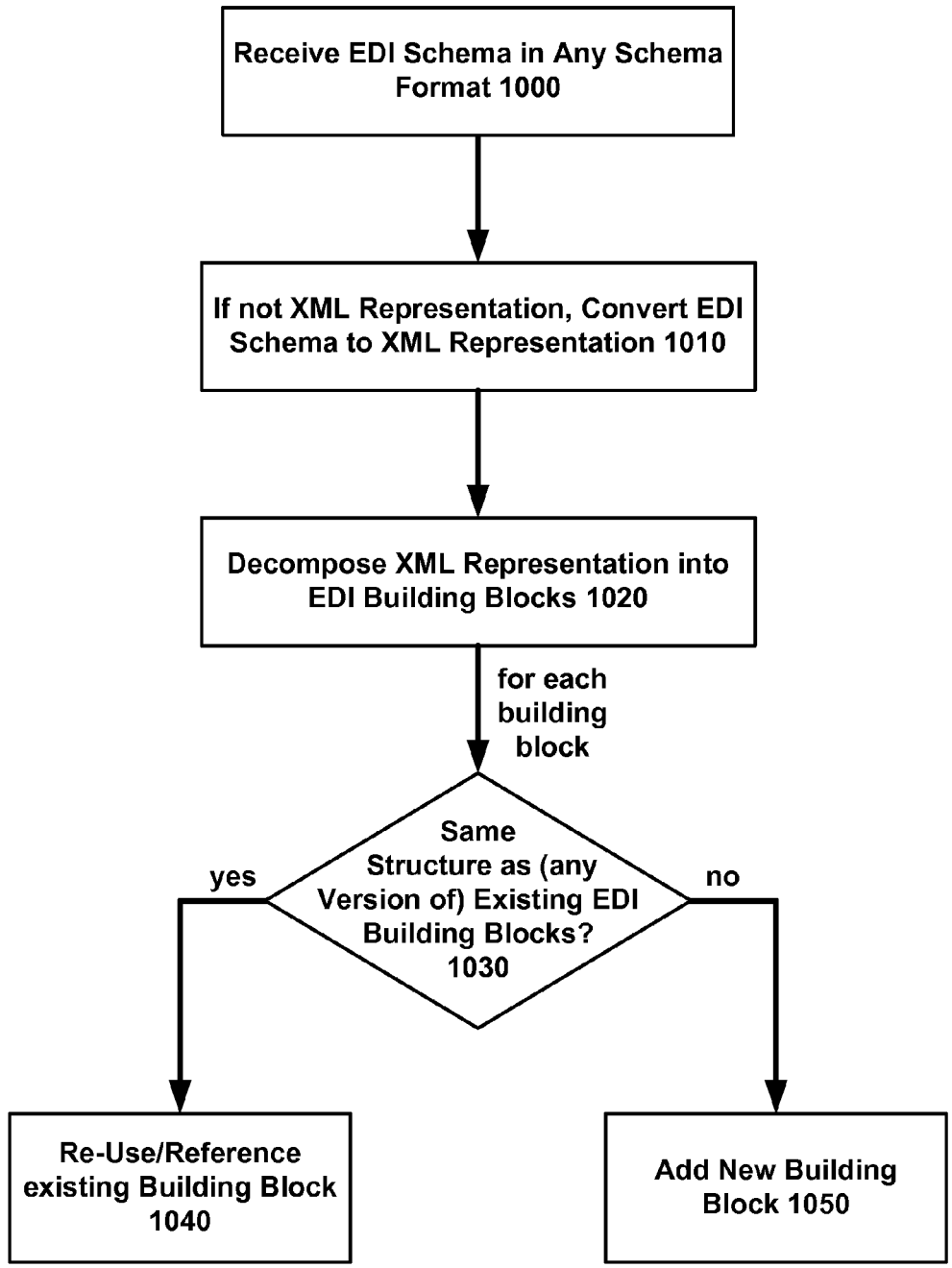
FIG. 10 is a flow diagram illustrating an exemplary process for determining structural similarity of building blocks in accordance with the invention to re-use existing building blocks in a dictionary store.

This is illustrated in more detail in FIG. 10. At 1000, an EDI Schema is received and if not an XML EDI Schema, an XML representation is generated by known conversions at 1010. Then, at 1020, the invention parses the XML stream, and determines the EDI building blocks that are present in the XML. For each building block, to save space in storage, the invention at 1030 determines via structural equivalence analysis whether any building blocks of the schema to be stored in the data store have the same structure as any versions of the existing building blocks of the data store. If so, then, at 1040, rather than storing a new copy of the building block, the existing building block is re-used by being referenced in the data store. If not, then a new building block is added at 1050.

This structural equivalence analysis allows external schemas to use different element names, which can be abstracted into a fewer number of distinct definitions. This relieves the user from having to manually scan the schemas and identify commonalities. The algorithm works much better than a simple name comparison, which is unable to extract commonality once name changes occur.

In another exemplary, non-limiting aspect of the invention, a user friendly data dictionary editor is provided that hides the complexity of an underlying type system, such as may be present in an XML schema. In this respect, XML schemas are difficult to use and manipulate. Although an EDI payload can be modeled around XML schemas, only a small fraction of XML schema constructs are relevant for EDI data. Thus, in accordance with the invention, a TSD editor is provided that can abstract away from the XML schema constructs, and hide them from the user.

Figure 11:
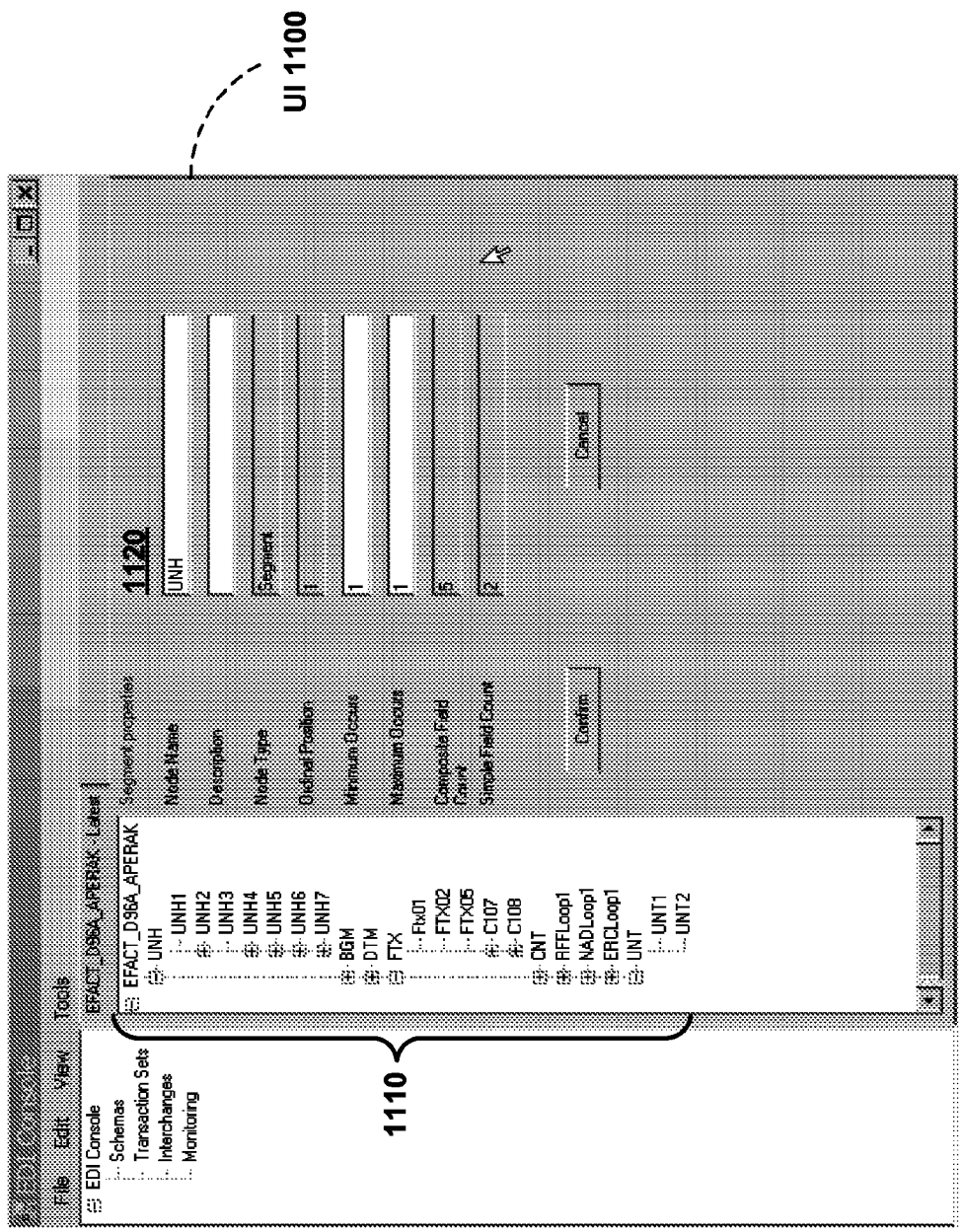
FIG. 11 illustrates an exemplary screenshot user interface (UI) showing the capability to abstract another type system, such as a type system defined for an XSD, away from the EDI elements of a TSD from a user standpoint in accordance with the invention.

Screenshot UI 1100 of FIG. 11 shows an exemplary TSD editor tool that hides away the complexity of XSDs. Screenshot UI 1100 displays a D96A version of Aperak Edifact schema. In XSD terms, there would be lot of other details which would have been confusing to the user if the invention had not hidden these details from the user by abstracting away only the EDI elements for display to the user.

With the tool of the invention, the same EDI information is represented in a more user friendly manner. For instance, on the left side of UI 1100 is a tree view 1110 of a sample TSD (latest version). In addition, the right pane 1120 displays properties of a node. With the tool of the invention, thus, a TSD can be represented and edited according to EDI properties 1120 including: Name, Type of the node (Loop, Segment, Composite or Simple data element), Description, Cardinality of the element and Count of component fields.

Supplemental Context Regarding EDI Messaging Systems

EDI is the exchange of structured information, by agreed upon messaging standards, from one computer or computer application to another by electronic means with minimal human intervention. Based on approved formatting standards and schemas, EDI is one of the ways businesses exchange computer-to-computer business information. For example, millions of companies around the world transmit and store data associated with business transactions (e.g., purchase orders, shipping/air bills, invoices, or the like) using EDI to conduct commerce.

EDI may thus be defined as computer-to-computer exchange of business information using 'approved' formatting standards, referring to specific interchange methods agreed upon by national or international standards bodies for the transfer of business transaction data. One typical application for EDI messaging is the automated purchase of goods and services, though EDI messages are by no means limited to any particular kind of business data. In this regard, millions of companies around the world use EDI to conduct commerce. In raw format, EDI data is transmitted as delimited files (without self describing tags) and therefore the encoding rules enforce very strict formatting rules to ensure the destination application is able to successfully parse and consume the information for down stream processing.

Organizations that send or receive documents from each other are referred to as "trading partners" in EDI terminology. The trading partners agree on the specific information to be transmitted and how it should be used. Service providers provide global platforms (also known as trading grids) to connect and integrate "business partners" around the world. They provide integration platforms that make the exchange of EDI (or XML) documents transparent and easy between diverse constituents. These providers also track and reconcile documents to reduce errors and improve supply chain performance.

EDI translation software provides the interface between the internal system and the common standards and applies to both "inbound" documents and "outbound" documents. Translation software may also utilize other methods or file formats translated to or from EDI.

It can be appreciated by those of skill in the art that the structured information of EDI files can also be represented with the extensible markup language (XML), and vice versa. Despite the use of EDI being somewhat unheralded relative to its counterpart XML, EDI files are still the data format used in a majority of electronic commerce transactions in the world.

Figure 12:
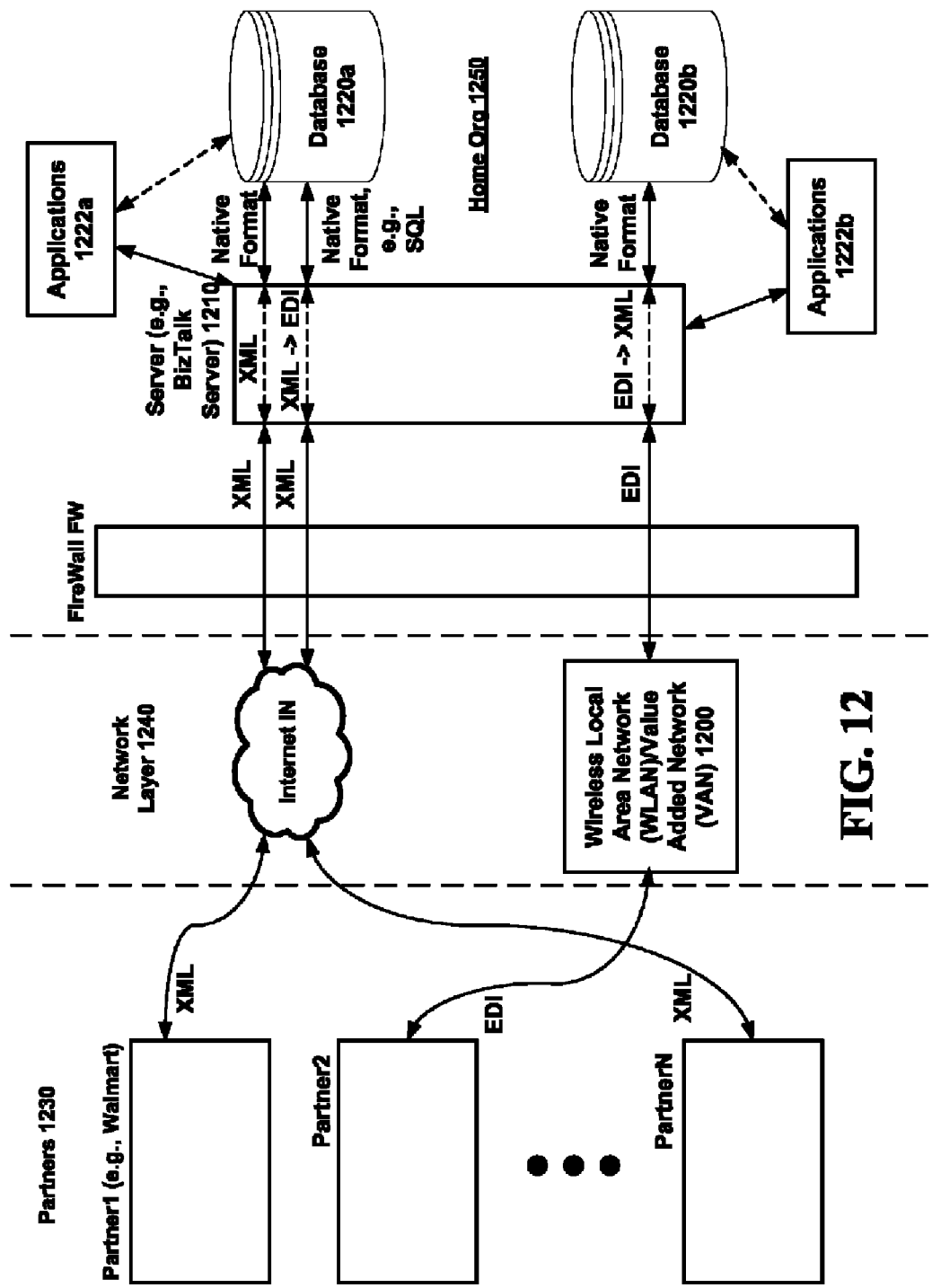
FIG. 12 is an exemplary block diagram of a representative EDI communications system between a home organization having a server and the trading partners of the home organization.

In the exemplary EDI system for a home organization 1250 shown in FIG. 12, typically server software, such as Microsoft's BizTalk Server 1210 can be deployed to interact outside of the home organization 1250 via network layer 1240 and to interface with databases 1220a, 1220b, etc. so that various applications 1222a, 1222b, etc., can interact with the automated storage of business records received by databases 1220a, 1220b, etc. EDI files or XML representations of EDI files can be received via Internet IN, or a wireless local area network (WLAN) or value added network (VAN) 1200 of network layer 1240, e.g., through firewall FW, and such EDI/XML messages can be received from any of a variety of trading partners 1230, i.e., partner1, partner2, . . . , partnerN. Server 1210 can handle any of the necessary conversions and parsing of EDI files or XML representations thereof, and any conversions to or from a native database format, such as SQL.

Typically, when an EDI messages are received, a server receiving the EDI messages can answer in terms of an acknowledgment of receipt of the EDI messages to its trading partner. The server will specify whether the EDI message is invalid according to the schema, and if invalid, will specify why, or the server will specify that the EDI message was accepted, accepted with errors or rejected.

Internet IN has enabled EDI transactions to be transmitted between trading partners in an even more efficient manner. Internet IN provides business and government agencies with an environment that is open, fast, cost effective, and widely accepted and used.

VAN 1200 is a mechanism that facilitates the transfer of electronic data between trading partners. A VAN 1200 can be thought of as a post office, or a dedicated pipe, that allows an entity to send EDI formatted data to one of their trading partners at any time. The VAN 1200 will hold the file of transmitted transactions until the trading partner to whom it is addressed retrieves it at a later time.

The EDI standards were designed to be independent of lower level technologies and can be transmitted using Internet protocols, such as the file transfer protocol (FTP), telnet and email, as well as private networks, such as value-added networks (VANs). EDI documents contain the same data that would normally be found in a paper document used for the same organizational function. For example, an EDI ship-from-warehouse order might be used by a manufacturer to tell a warehouse to ship product(s) to a retailer. It typically has a ship to address, bill to address, a list of product numbers (e.g., a UPC code) and quantities. It may also have other information if the parties agree to include it. However, EDI is not confined to just business data directly related to trade, rather but encompasses all fields such as medicine (patient records, laboratory results, etc.), transport (container and modal information, etc.), engineering and construction, etc., i.e., anywhere a first entity may wish to automate the exchange of data with another entity.

In a typical EDI transaction model, a large business entity or an EDI integration broker trades with numerous partners and has the technical capability to handle numerous EDI transaction data in various EDI formats and schemas. These entities, also known as "hubs," transact with one or more suppliers, also known as "spokes." Each of the spokes typically is a relatively small business entity that is only capable of dealing with one hub.

Before the spokes attempt to initiate transactions via EDI with the hub, the hub typically transmits various EDI schemas to the spokes so that the spokes can properly format the EDI transactions according to the EDI schemas.

Figure 13:
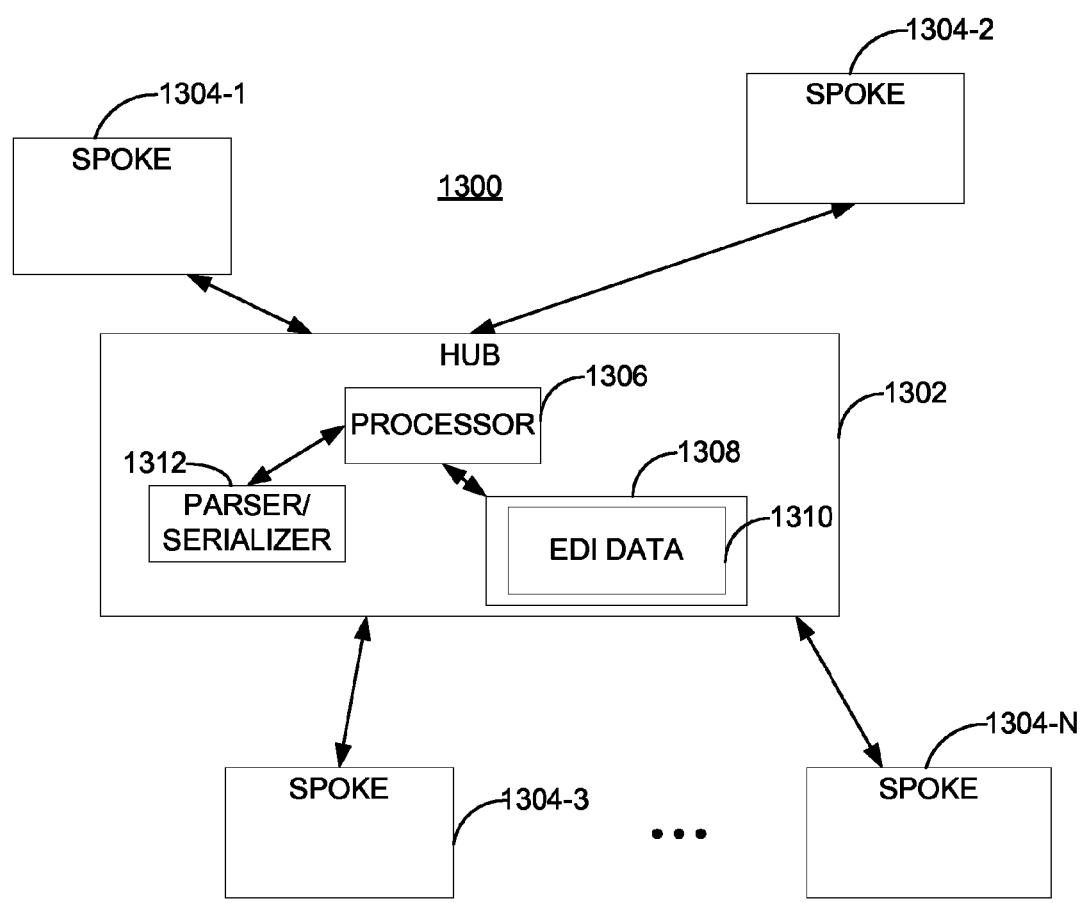
FIG. 13 is an exemplary block diagram of a representative EDI system including a hub and spoke architecture.
Figure 16:
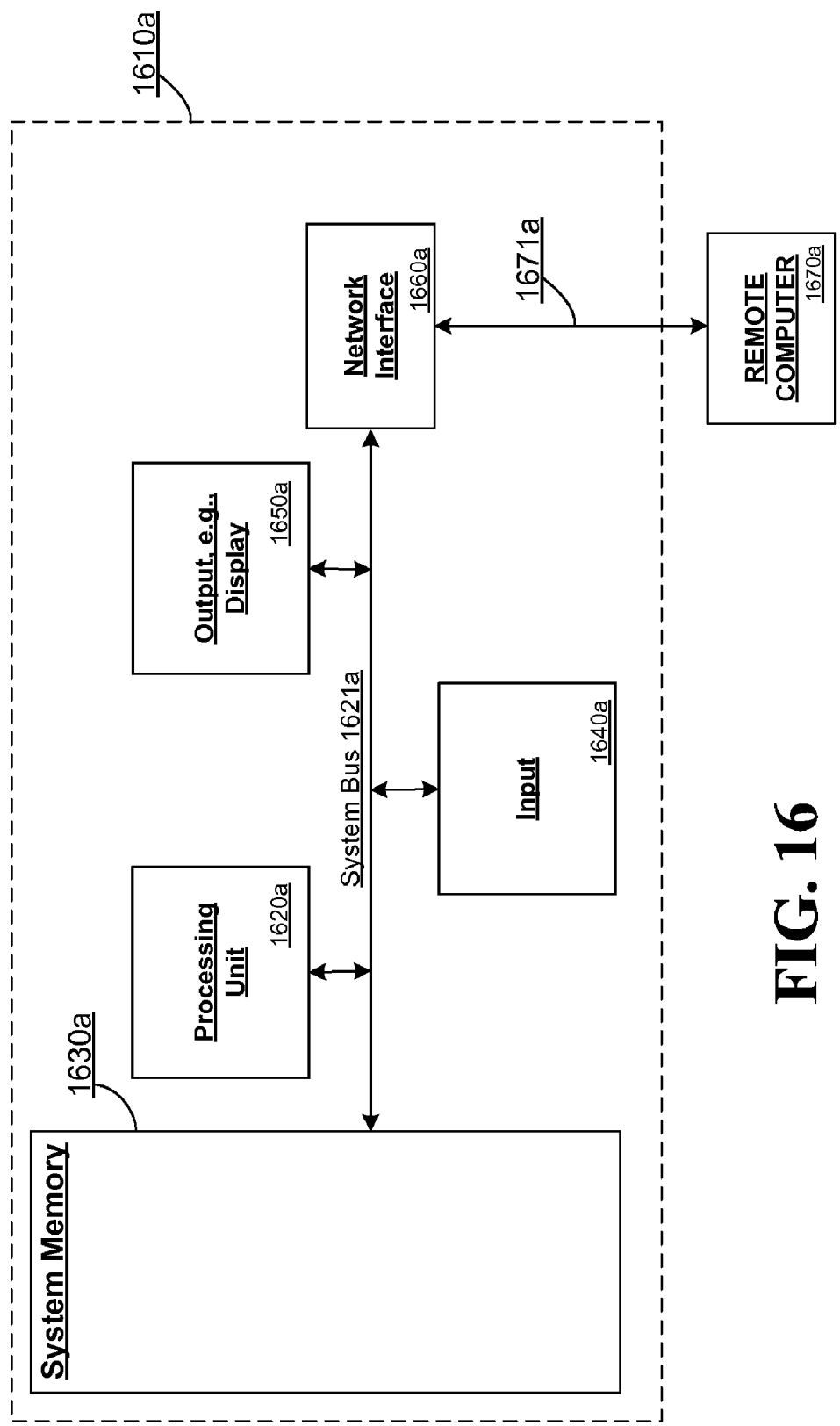
FIG. 16 is a block diagram representing an exemplary non-limiting computing system or operating environment in which the present invention may be implemented.

FIG. 13 is a block diagram illustrating a system for conducting EDI transactions according to exemplary non-limiting embodiments of the invention. A system 1300 is illustrated for conducting EDI transactions. System 1300 includes a hub 1302 linked to and communicating with one or more spokes (e.g., spokes 1304-1, 1304-2, 1304-3, . . . , 1304-N). In one embodiment, the hub 1302 includes a server computer or a computing device serving one or more processors (e.g., processor 1306) or processing units for executing computer-executable instructions for serving the spokes 1304. In one example, the spokes 1304 include a computing device having one or more components included in or coupled with a computer 1600a, as shown in FIG. 16.

In one example, the hub 1302 also includes a memory area 1308 for storing one or more EDI schemas, such as an EDI schema 1310, and includes a parser/serializer 1312. Initially, the hub 1302 and the spokes 1304-1, 1304-2, 1304-3, . . . , 1304-N establish agreements as to the EDI formats or standards to be used for transmitting transaction data therebetween. Once the parties determine the particular EDI formats or standards to use, the hub 1302 selects the appropriate EDI schemas to be transmitted to the spokes 1304-1, 1304-2, 1304-3, . . . , 1304-N. In another example, the hub 1302 may choose to select all EDI schemas for all types of transactions, such as purchase orders, bills of lading, invoices, payrolls, or the like, to the spokes 1304-1, 1304-2, 1304-3, . . . , 1304-N.

Although the communications between the hub 1302 and the spokes 1304-1, 1304-2, 1304-3, . . . , 1304-N can be a private or public communications network, a wired or wireless network, the spokes 1304-1, 1304-2, 1304-3, . . . , 1304-N typically lack the hardware resources to handle large amount of EDI schemas sent from the hub 1302. In addition, the type and bandwidth of computing network communications for the spokes 1304-1, 1304-2, 1304-3, . . . , 1304-N are not equipped to handle such demand imposed by the thousands of EDI schemas, which can reach several Gigabytes in data size.

Figure 14:
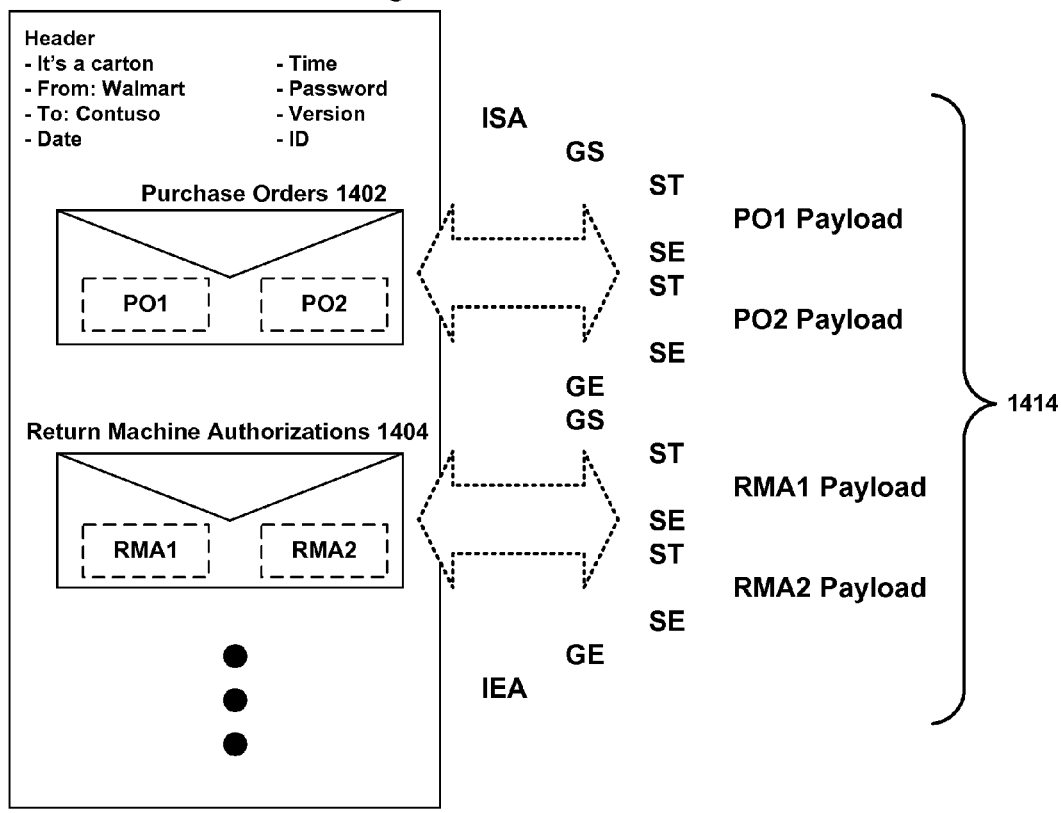
FIG. 14 is an exemplary block diagram representative of an interchange data structure including a plurality of EDI transactions.

FIG. 14 in turn illustrates that an organization can generate an interchange 1400—a sort of carton for EDI messages—which includes a plurality of EDI messages. Interchange 1400 typically includes a header which includes a type of document, from whom the document originated, to whom the document is addressed, the date, the time, any password information, version information, identification information, and the like. Then the interchange 1400 lists a series of purchase orders 1402 and return machine authorizations (RMAs) 1404, conceptually shown as envelopes in the carton. In turn, each envelope conceptually represents one or more individual EDI files, or messages. For instance, purchase orders 1402 include individual purchase orders PO1 and PO2, and RMAs 1404 include RMAs RMA1 and RMA2, and so on.

In turn, there is a flat file native EDI format that corresponds to this conceptual relationship between carton→envelopes→messages. As illustrated by shell 1414 corresponding to the conceptual representation, the ISA←→IEA indent level represents the beginning and end of the interchange (carton). The GS and GE indent levels represent the beginning and end of any envelopes within the carton, and the ST and SE indent levels represent the beginning and end of any messages within an envelope, i.e., inbetween any ST and SE will be an individual message payload, such as PO1 Payload, PO2 Payload, RMA1 Payload and RMA2 Payload.

There are several advantages of using EDI all of which provide distinct benefits to the user. One of the most notable benefits to using EDI is the time-saving capability it provides. By eliminating the process of distributing hard copies of information throughout the company, easy access to electronic data simplifies inter-department communication. Also, another time-savings advantage is the ability to track the origin of all information therefore significantly reducing time spent on corresponding with the source of the information.

Another benefit for the user of this information system is the ultimate savings in costs for an organization. Although the initial set-up costs may seem high, the overall savings received in the long run ensures its value. For any business, regardless of its size, hard-copy print outs and document shipping costs add up. EDI allows for a paper-less exchange of information reducing handling costs and worker productivity that is involved with the organization of paper documents.

EDI has another strong advantage over paper-based information exchange, which has to do with accuracy of information. When the information is already stored electronically, it speeds up an organizations ability to check for accuracy and make any necessary corrections as the data is already input to the system. Also, unlike paper-based methods, EDI allows for the ability to send and receive information at any time thereby tremendously improving an organizations ability to communicate quickly and efficiently.

A disadvantage of using EDI involves the initial set-up. The preliminary expenses and time that arise from the implementation, customization and training can be costly. However, as EDI systems continue to improve, such as by using the batching membership evaluation techniques of the invention, such disadvantage is disappearing as ease of use increase.

EDIFACT and X12 Standards for EDI Documents

There are two major sets of EDI standards which can be used to generate and receive/process EDI messages: the United Nations Electronic Data Interchange for Administration, Commerce and Transport, which is a translation of UN/EDIFACT ("EDIFACT") and the American National Standards Institute's (ANSI) Accredited Standards Committee (ASC) X12 ("X12"). Both used worldwide, X12 tends to be more popular in North America than EDIFACT. These standards prescribe the formats, character sets, and data elements used in the exchange of documents and forms, such as invoices and purchase orders, e.g., purchase orders are called "ORDERS" in EDIFACT and "850s" in X12.

Whichever selected, the standard dictates which pieces of information are mandatory for a particular document, which pieces are optional and gives the rules for the structure of the document. In this regard, with optional pieces, two EDI documents can follow the same standard and contain different sets of information. For example, a food company might indicate a particular product expiration date while a clothing manufacturer might choose to send color and size information.

For illustrative purposes only, the following is an example EDIFACT message, for instance, that might be used to answer to a product availability request:

```
UNB+IATB:1+6XPPC+LHPPC+VV40101:0VV50+1'
UNH+1+PAORES:VV3:1:IA'
MSG+1:45'
IFT+3+?*XYZCOMPANY AVAILABILITY?*'
ERC+A7V:1:AMD'
IFT+3+NO MORE FLIGHTS'
ODI'
TVL+2404VV3:1000::1220+FRA+JFK+DL+400+C'
PDI++C:3+Y::3+F::1'
APD+74C:0:::6++++++6X'
TVL+2404VV3:1740::2030+JFK+MIA+DL+081+C'
PDI++C:4'
APD+EM2:0:1630::6+++++++DA'
UNT+13+1'
UNZ+1+1'
``` wherein the following symbols have the following meanings:
' is a segment terminator;
+ is a data element separator;
: is a component data element separator;
* is a repetition separator; and
? is a release character.

To explain the information contained in some of the above segments, the segment of the above exemplary EDI file designated by "UNH+1+PAORES:VV3:1:IA'" is the header segment. A header segment is required at the start of every EDI message. With this particular file segment, the message name and version is specified as PAORES VV3 revision 1 and it was defined by the organization IATA. The segment of the above exemplary EDI file designated by "IFT+3+NO MORE FLIGHTS'" is an 'Interactive Free Text' segment containing the text 'NO MORE FLIGHTS.' The segment of the above exemplary EDI file designated by "UNT+13+1'" is the tail segment, whereby it is indicated that the message sent contains 13 segments.

EDIFACT files have a hierarchical structure. The top level element is referred to a message. A message is a sequence of groups and segments. A group or segment can be mandatory (M) or conditional (C) and can be specified to repeat, for example CVVVV would indicate between 0 and VVVV repetitions of a segment or group, whereas MVVVV would mean between 1 and VVVV repetitions.

A group, like a message, is a sequence of segments or groups. The first segment/group beneath a group must be mandatory. If the logic of the situation demands it is conditional, then the group itself should be made conditional instead.

Exemplary Networked and Distributed Environments

One of ordinary skill in the art can appreciate that the invention can be implemented in connection with any computer or other client or server device, which can be deployed as part of a computer network, or in a distributed computing environment, connected to any kind of data store. In this regard, the present invention pertains to any computer system or environment having any number of memory or storage units, and any number of applications and processes occurring across any number of storage units or volumes, which may be used in connection with processes for storing EDI schema in accordance with the present invention. The present invention may apply to an environment with server computers and client computers deployed in a network environment or a distributed computing environment, having remote or local storage. The present invention may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the systems and methods for storing EDI Schema in accordance with the invention.

Figure 15:
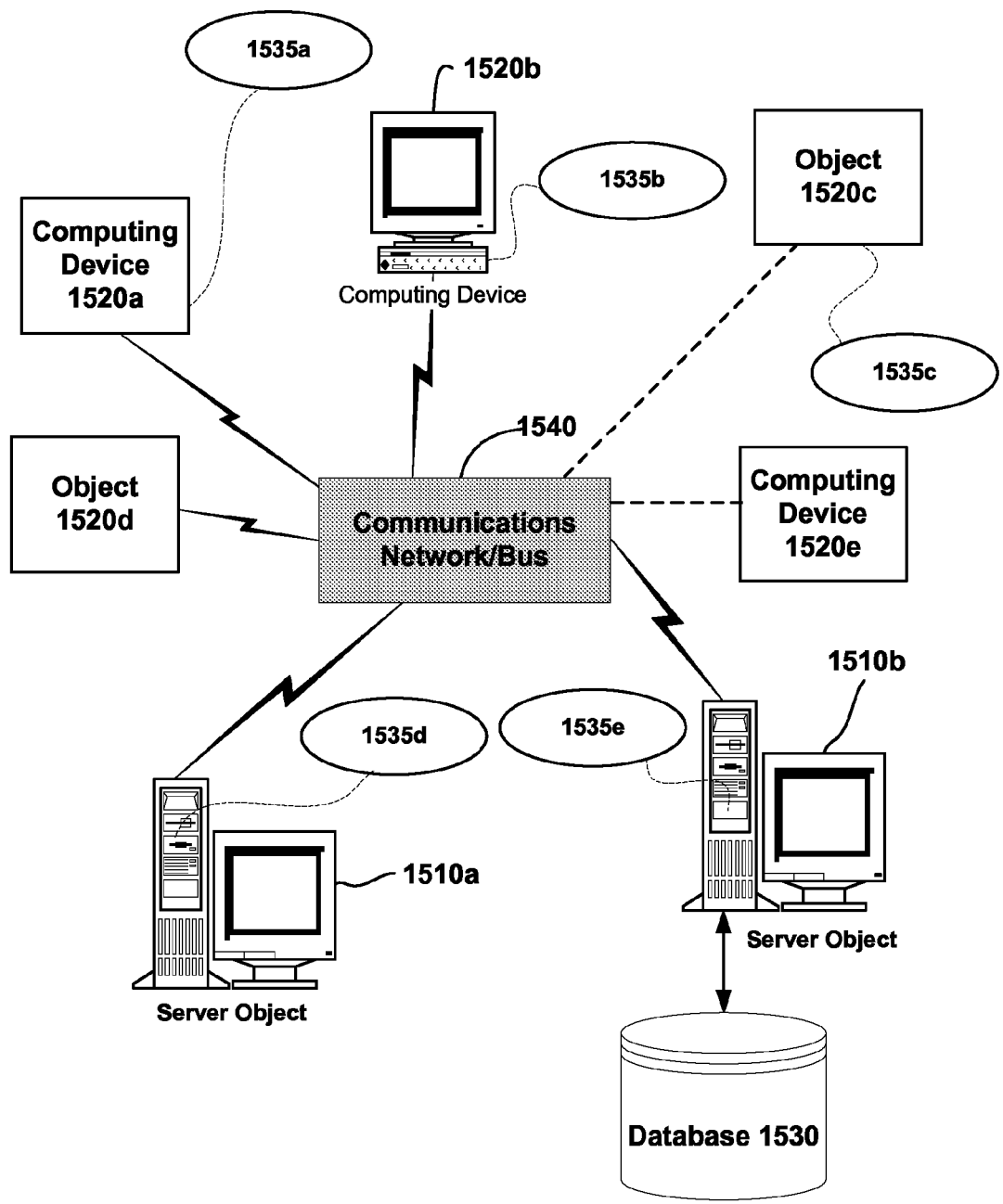
FIG. 15 is a block diagram representing an exemplary non-limiting networked environment in which the present invention may be implemented.

FIG. 15 provides a schematic diagram of an exemplary networked or distributed computing environment. The distributed computing environment comprises computing objects 1510a, 1510b, etc. and computing objects or devices 1520a, 1520b, 1520c, 1520d, 1520e, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 1540. This network may itself comprise other computing objects and computing devices that provide services to the system of FIG. 15, and may itself represent multiple interconnected networks. In accordance with an aspect of the invention, each object 1510a, 1510b, etc. or 1520a, 1520b, 1520c, 1520d, 1520e, etc. may contain an application that might make use of an API, or other object, software, firmware and/or hardware, suitable for use with the systems and methods for storing EDI Schema in accordance with the invention.

It can also be appreciated that an object, such as 1520c, may be hosted on another computing device 1510a, 1510b, etc. or 1520a, 1520b, 1520c, 1520d, 1520e, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to storing, creating, editing, etc. EDI Schema according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, any of the computing devices of the present invention may share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 15, as an example, computers 1520a, 1520b, 1520c, 1520d, 1520e, etc. can be thought of as clients and computers 1510a, 1510b, etc. can be thought of as servers where servers 1510a, 1510b, etc. maintain the data that is then replicated to client computers 1520a, 1520b, 1520c, 1520d, 1520e, etc., although any computer can be considered a client, a server, or both, depending on the circumstances. Any of these computing devices may be processing data or requesting services or tasks that may implicate the storage management and versioning of EDI Schema in accordance with the invention.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for managing storage for EDI schema in accordance with the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 15 illustrates an exemplary networked or distributed environment, with server(s) in communication with client computer (s) via a network/bus, in which the present invention may be employed. In more detail, a number of servers 1510*a*, 1510*b*, etc. are interconnected via a communications network/bus 1540, which may be a LAN, WAN, intranet, GSM network, the Internet, etc., with a number of client or remote computing devices 1520*a*, 1520*b*, 1520*c*, 1520*d*, 1520*e*, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to store EDI schema.

In a network environment in which the communications network/bus 1540 is the Internet, for example, the servers 1510*a*, 1510*b*, etc. can be Web servers with which the clients 1520*a*, 1520*b*, 1520*c*, 1520*d*, 1520*e*, etc. communicate via any of a number of known protocols such as HTTP. Servers 1510*a*, 1510*b*, etc. may also serve as clients 1520*a*, 1520*b*, 1520*c*, 1520*d*, 1520*e*, etc., as may be characteristic of a distributed computing environment.

As mentioned, communications may be wired or wireless, or a combination, where appropriate. Client devices 1520*a*, 1520*b*, 1520*c*, 1520*d*, 1520*e*, etc. may or may not communicate via communications network/bus 14, and may have independent communications associated therewith. For example, in the case of a TV or VCR, there may or may not be a networked aspect to the control thereof. Each client computer 1520*a*, 1520*b*, 1520*c*, 1520*d*, 1520*e*, etc. and server computer 1510*a*, 1510*b*, etc. may be equipped with various application program modules or objects 1535*a*, 1535*b*, 1535*c*, 1535*d*, 1535*e*, etc., and with connections or access to various types of storage elements or objects, across which files or data streams may be stored or to which portion(s) of files or data streams may be downloaded, transmitted or migrated. Any one or more of computers 1510*a*, 1510*b*, 1520*a*, 1520*b*, 1520*c*, 1520*d*, 1520*e*, etc. may be responsible for the maintenance and updating of a database 1530 or other storage element, such as a database or memory 1530 for storing data processed or saved according to the invention. Thus, the present invention can be utilized in a computer network environment having client computers 1520*a*, 1520*b*, 1520*c*, 1520*d*, 1520*e*, etc. that can access and interact with a computer network/bus 1540 and server computers 1510*a*, 1510*b*, etc. that may interact with client computers 1520*a*, 1520*b*, 1520*c*, 1520*d*, 1520*e*, etc. and other like devices, and databases 1530.

Exemplary Computing Device

As mentioned, the invention applies to any device wherein it may be desirable to create, modify or store an EDI schema. It should be understood, therefore, that handheld, portable and other computing devices and computing objects of all kinds are contemplated for use in connection with the present invention, i.e., anywhere that a device may transact in an EDI system. Accordingly, the below general purpose remote computer described below in FIG. 16 is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 16 thus illustrates an example of a suitable computing system environment 1600*a* in which the invention may be implemented, although as made clear above, the computing system environment 1600*a* is only one example of a suitable computing environment for a media device and is not intended to suggest any limitation as to the scope of use or functionality of the invention. Neither should the computing environment 1600*a* be interpreted as having any dependency or requirement relating to any one or combination of components illustrated in the exemplary operating environment 1600*a*.

With reference to FIG. 16, an exemplary remote device for implementing the invention includes a general purpose computing device in the form of a computer 1610*a*. Components of computer 1610*a* may include, but are not limited to, a processing unit 1620*a*, a system memory 1630*a*, and a system bus 1621*a* that couples various system components including the system memory to the processing unit 1620*a*. The system bus 1621*a* may be any of several types of bus structures including a memory bus or memory controller, a peripheral bus, and a local bus using any of a variety of bus architectures.

Computer 1610*a* typically includes a variety of computer readable media. Computer readable media can be any available media that can be accessed by computer 1610*a*. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1610*a*. Communication media typically embodies computer readable instructions, data structures, program modules or other data in a modulated data signal such as a carrier wave or other transport mechanism and includes any information delivery media.

The system memory 1630*a* may include computer storage media in the form of volatile and/or nonvolatile memory such as read only memory (ROM) and/or random access memory (RAM). A basic input/output system (BIOS), containing the basic routines that help to transfer information between elements within computer 1610*a*, such as during start-up, may be stored in memory 1630*a*. Memory 1630*a* typically also contains data and/or program modules that are immediately accessible to and/or presently being operated on by processing unit 1620*a*. By way of example, and not limitation, memory 1630a may also include an operating system, application programs, other program modules, and program data.

The computer 1610a may also include other removable/non-removable, volatile/nonvolatile computer storage media. For example, computer 1610a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1621a through a non-removable memory interface such as an interface, and a magnetic disk drive or optical disk drive is typically connected to the system bus 1621a by a removable memory interface, such as an interface.

A user may enter commands and information into the computer 1610a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 1620a through user input 1640a and associated interface(s) that are coupled to the system bus 1621a, but may be connected by other interface and bus structures, such as a parallel port, game port or a universal serial bus (USB). A graphics subsystem may also be connected to the system bus 1621a. A monitor or other type of display device is also connected to the system bus 1621a via an interface, such as output interface 1650a, which may in turn communicate with video memory. In addition to a monitor, computers may also include other peripheral output devices such as speakers and a printer, which may be connected through output interface 1650a.

The computer 1610a may operate in a networked or distributed environment using logical connections to one or more other remote computers, such as remote computer 1670a, which may in turn have media capabilities different from device 1610a. The remote computer 1670a may be a personal computer, a server, a router, a network PC, a peer device or other common network node, or any other remote media consumption or transmission device, and may include any or all of the elements described above relative to the computer 1610a. The logical connections depicted in FIG. 16 include a network 1671a, such local area network (LAN) or a wide area network (WAN), but may also include other networks/buses. Such networking environments are commonplace in homes, offices, enterprise-wide computer networks, intranets and the Internet.

When used in a LAN networking environment, the computer 1610a is connected to the LAN 1671a through a network interface 1660a or adapter. When used in a WAN networking environment, the computer 1610a typically includes a communications component, such as a modem, or other means for establishing communications over the WAN, such as the Internet. A communications component, such as a modem, which may be internal or external, may be connected to the system bus 1621a via the user input interface of input 1640a, or other appropriate mechanism. In a networked environment, program modules depicted relative to the computer 1610a, or portions thereof, may be stored in a remote memory storage device. It will be appreciated that the network connections shown and described are exemplary and other means of establishing a communications link between the computers may be used.

Exemplary Distributed Computing Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the invention may also be implemented via an operating system, or a "middle man" object, a control object, hardware, firmware, intermediate language instructions or objects, etc., such that the methods for storing, creating, versioning, re-using and editing EDI schema in accordance with the invention may be included in, supported in or accessed via all of the languages and services enabled by managed code, such as .NET code, and in other distributed computing frameworks as well.

There are multiple ways of implementing the present invention, e.g., an appropriate API, tool kit, driver code, operating system, control, standalone or downloadable software object, etc. which enables applications and services to use the systems and methods for managing storage of EDI schema in accordance with the invention. The invention contemplates the use of the invention from the standpoint of an API (or other software object), as well as from a software or hardware object that receives an EDI schema in accordance with the invention. Thus, various implementations of the invention described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts may be applied to any computing device or system in which it is desirable to store, generate or edit EDI schema. For instance, the tool and/or storage management techniques of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the EDI schema storage of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of FIG. 10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any language to provide methods for storing EDI schema according to the re-usable building blocks of the invention. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for evaluating an electronic data interchange (EDI) schema for entry into a data store that stores a plurality of EDI schema as a plurality of pre-existing EDI schema elements, the method performed by executing computer instructions upon one or more computer processors, the method including:
receiving at least one schema representing EDI transaction set definition (TSD) information, the at least one schema comprising a root node, the root node comprising one or more blocks, and each of the one or more blocks comprising one of a segment and a loop;
storing the at least one schema in computer storage media;
determining whether the received schema is an XML EDI schema;
when the received schema is not an XML EDI schema, generating an XML EDI schema representation of the received schema;
determining a plurality of EDI schema elements that comprise the at least one schema by parsing the XML EDI schema which is one of the received XML EDI schema or the generated XML EDI schema;
for each EDI schema element of the plurality of EDI schema elements, performing a structural equivalence analysis of the each EDI schema element to the plurality of pre-existing EDI schema elements in the data store;
determining from the structural equivalence analysis whether the each EDI schema element has the same structure as any version of the pre-existing EDI schema elements in the data store;
when the each EDI schema element has the same structure, re-using the corresponding pre-existing EDI schema element by creating a reference to the pre-existing EDI schema element in the data store; and
when the each EDI schema element does not have the same structure as any of the plurality of pre-existing EDI schema elements, adding a new EDI schema element to the data store.

2. The method of claim 1, further including:
translating the at least one schema to an extensible markup language (XML) representation of the EDI TSD information.

3. The method of claim 1, wherein said determining includes determining at least one of a data type, simple data element, composite data element, segment or loop that comprise the at least one schema.

4. The method of claim 1, wherein the structural equivalence analysis comprises abstracting element names such that elements with different names but having similar structures are considered equivalent.

5. A computer program product comprising one or more physical computer readable storage media having encoded thereon computer executable instructions for performing the method of evaluating an electronic data interchange (EDI) schema for entry into a data store that stores a plurality of EDI schema as a plurality of pre-existing EDI schema elements, the method including:
receiving at least one schema representing EDI transaction set definition (TSD) information, the at least one schema comprising a root node, the root node comprising one or more blocks, and each of the one or more blocks comprising one of a segment and a loop;
storing the at least one schema in computer storage media;
determining whether the received schema is an XML EDI schema;
when the received schema is not an XML EDI schema, generating an XML EDI schema representation of the received schema;
determining a plurality of EDI schema elements that comprise the at least one schema by parsing the XML EDI schema which is one of the received XML EDI schema or the generated XML EDI schema;
for each EDI schema element of the plurality of EDI schema elements, performing a structural equivalence analysis of the each EDI schema element to the plurality of pre-existing EDI schema elements in the data store;
determining from the structural equivalence analysis whether the each EDI schema element has the same structure as any version of the pre-existing EDI schema elements in the data store;
when the each EDI schema element has the same structure, re-using the corresponding pre-existing EDI schema element by creating a reference to the pre-existing EDI schema element in the data store; and
when the each EDI schema element does not have the same structure as any of the plurality of pre-existing EDI schema elements, adding a new EDI schema element to the data store.

6. A computing device comprising one or more computer processors, computer system memory, and one or more computer-readable storage media which have encoded thereon computer instructions which, when executed upon the one or more computer processors, performs the method of evaluating an electronic data interchange (EDI) schema for entry into a data store that stores a plurality of EDI schema as a plurality of pre-existing EDI schema elements, the method including:

receiving at least one schema representing EDI transaction set definition (TSD) information, the at least one schema comprising a root node, the root node comprising one or more blocks, and each of the one or more blocks comprising one of a segment and a loop;

storing the at least one schema in computer storage media;

determining whether the received schema is an XML EDI schema;

when the received schema is not an XML EDI schema, generating an XML EDI schema representation of the received schema;

determining a plurality of EDI schema elements that comprise the at least one schema by parsing the XML EDI schema which is one of the received XML EDI schema or the generated XML EDI schema;

for each EDI schema element of the plurality of EDI schema elements, performing a structural equivalence analysis of the each EDI schema element to the plurality of pre-existing EDI schema elements in the data store;

determining from the structural equivalence analysis whether the each EDI schema element has the same structure as any version of the pre-existing EDI schema elements in the data store;

when the each EDI schema element has the same structure, re-using the corresponding pre-existing EDI schema element by creating a reference to the pre-existing EDI schema element in the data store; and when the each EDI schema element does not have the same structure as any of the plurality of pre-existing EDI schema elements, adding a new EDI schema element to the data store.

\* \* \* \* \*